(12) United States Patent
Mahara

(10) Patent No.: US 11,895,412 B2
(45) Date of Patent: Feb. 6, 2024

(54) IMAGING DEVICE AND IMAGING METHOD

(71) Applicant: SONY SEMICONDUCTOR SOLUTIONS CORPORATION, Kanagawa (JP)

(72) Inventor: Kumiko Mahara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/908,494

(22) PCT Filed: Jan. 18, 2021

(86) PCT No.: PCT/JP2021/001497
§ 371 (c)(1),
(2) Date: Aug. 31, 2022

(87) PCT Pub. No.: WO2021/181882
PCT Pub. Date: Sep. 16, 2021

(65) Prior Publication Data
US 2023/0095241 A1    Mar. 30, 2023

(30) Foreign Application Priority Data
Mar. 10, 2020 (JP) ................ 2020-040719

(51) Int. Cl.
*H04N 25/42* (2023.01)
*H04N 25/772* (2023.01)
(Continued)

(52) U.S. Cl.
CPC .......... *H04N 25/42* (2023.01); *G01S 7/4914* (2013.01); *H04N 25/772* (2023.01); *G01S 17/08* (2013.01)

(58) Field of Classification Search
CPC .... H04N 25/42; H04N 25/772; H04N 25/443; H04N 25/53; G01S 7/4914; G01S 17/08; G01S 17/894; G01C 3/06
See application file for complete search history.

(56) References Cited

U.S. PATENT DOCUMENTS

| 2018/0156898 | A1* | 6/2018 | Suzuki | H04N 25/771 |
| 2020/0033456 | A1* | 1/2020 | Wang | H04N 23/56 |
| 2020/0349728 | A1* | 11/2020 | Bitan | G01S 17/894 |

FOREIGN PATENT DOCUMENTS

| JP | 2009-008537 A | 1/2009 |
| JP | 2020-013586 A | 1/2020 |

(Continued)

OTHER PUBLICATIONS

International Search Report and Written Opinion of PCT Application No. PCT/JP2021/001497, dated Feb. 16, 2021, 08 pages of ISRWO.

*Primary Examiner* — Michael E Teitelbaum
(74) *Attorney, Agent, or Firm* — CHIP LAW GROUP

(57) ABSTRACT

Provided is an imaging device that is operable to reduce power upon receiving light, even with resolution of the imaging device increased. An imaging device includes: a plurality of pixels that are arranged in a matrix manner and receive reflected light from a target region, each of the plurality of pixels having a light receiving element that outputs an electric signal based on charge accumulated in either one of first and second charge accumulation parts in accordance with the reflected light; and a control part that executes switching control of the first and second charge accumulation parts by switching frequencies for each pixel region constituted of a pixel group of at least one part of an imaging frame formed by the plurality of pixels, the switching frequencies being different from each other.

6 Claims, 11 Drawing Sheets

(51) Int. Cl.
*G01S 7/4914* (2020.01)
*G01S 17/08* (2006.01)

(56) References Cited

FOREIGN PATENT DOCUMENTS

| | | |
|---|---|---|
| JP | 2020-025265 A | 2/2020 |
| WO | 2017/022220 A1 | 2/2017 |

* cited by examiner

IMAGING DEVICE AND IMAGING METHOD

CROSS REFERENCE TO RELATED APPLICATIONS

This application is a U.S. National Phase of International Patent Application No. PCT/JP2021/001497 filed on Jan. 18, 2021, which claims priority benefit of Japanese Patent Application No. JP 2020-040719 filed in the Japan Patent Office on Mar. 10, 2020. Each of the above-referenced applications is hereby incorporated herein by reference in its entirety.

TECHNICAL FIELD

Technology (the present technology) according to the present disclosure relates to an imaging device and an imaging method which are used for a distance measuring device.

BACKGROUND ART

As a distance measuring device which is of a Time of Flight (ToF) type and measures a distance based on time of light flight, there have been known a direct ToF (dToF) type distance measuring device which measures a distance from time of light flight directly measured by utilizing pulse waves; and an indirect ToF (iToF) which measures a distance from time of light flight indirectly calculated by utilizing phases of modulation light.

In the iToF type distance measuring device of these, light is radiated from a light source, a light receiving element receives light reflected by a target object, and a photoelectric conversion part in the light receiving element performs photoelectric conversion. Charge generated by the photoelectric conversion part is distributed by a plurality of transfer transistors to a plurality of charge accumulation parts. Then, on the basis of phase signals in accordance with charge amounts accumulated in a plurality of charge accumulation parts, a distance up to the target object is calculated (for example, refer to Patent Document 1).

CITATION LIST

Patent Document

Patent Document 1: Japanese Patent Application Laid-Open No. 2009-8537

SUMMARY OF THE INVENTION

Problems to be Solved by the Invention

In the meantime, increasing of resolution has been strongly demanded of also the above-mentioned distance measuring device. In association with this increasing of resolution, data which is read once increases.

In addition, since also as to exposure periods, charge accumulation regions are switched at high speed for each pixel, power upon receiving the light increases.

Furthermore, in a case where data of one part of pixel regions is wanted or even in a case where distance measurement information at high accuracy of only one part of the pixels is wanted, since light reception for all pixels is performed under the same conditions, power increases.

In view of the above-described circumstances, the present disclosure has been devised, and objects of the present disclosure are to provide an imaging device and an imaging method which allow a reduction in power upon receiving light, even with resolution increased.

Solutions to Problems

One aspect of the present disclosure is an imaging device that includes: a plurality of pixels that are arranged in a matrix manner and receive reflected light from a target region, each of the plurality of pixels having a light receiving element that outputs an electric signal based on charge being accumulated in either one of first and second charge accumulation parts in accordance with the reflected light; and a control part that executes switching control of the first and second charge accumulation parts by switching frequencies for each pixel region being constituted of a pixel group of at least one part of an imaging frame being formed by the plurality of pixels, the switching frequencies being different from each other.

Another aspect of the present disclosure is an imaging method that includes: receiving reflected light from a target region by a plurality of pixels being arranged in a matrix manner, each of the plurality of pixels having a light receiving element, and outputting an electric signal based on charge being accumulated in first and second charge accumulation parts in accordance with the reflected light, the light receiving element including first and second charge accumulation parts; and executing switching control of the first and second charge accumulation parts by switching frequencies for each pixel region being constituted of a pixel group of at least one part of an imaging frame being formed by the plurality of pixels, the switching frequencies being different from each other.

MODE FOR CARRYING OUT THE INVENTION

Figure 1:
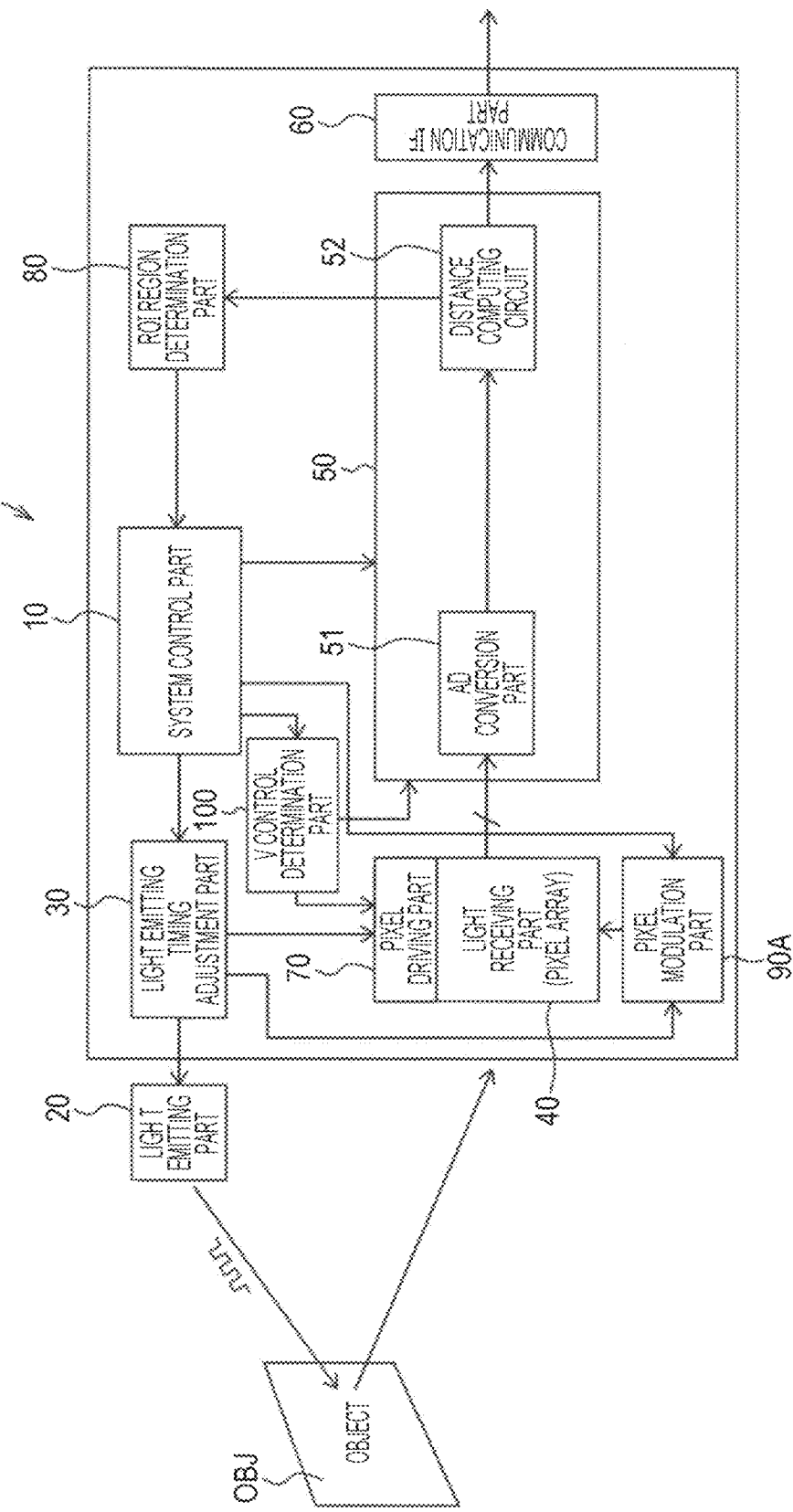
FIG. 1 is a block diagram showing one example of a configuration of a distance measuring device in a first embodiment of the present technology.

Hereinafter, with reference to the accompanying drawings, embodiments of the present disclosure will be described. In the representation of the drawings referenced in the below description, the same or similar parts are denoted by the same or similar reference signs, and overlapped description will be omitted. However, the drawings are schematic, and it should be noted that each relationship between a thickness and a plane dimension, each ratio of thicknesses of each device and each member, and the like are different from those in reality. Accordingly, specific thicknesses and dimensions should be determined by considering the below description. In addition, it is a matter of course that in the drawings, parts of relationship and ratios between dimensions which are different from each other are included.

It is to be noted that effects described in the present description are merely illustrative and not restrictive and there may be other effects.

First Embodiment

<Configuration of Distance Measuring Device>

FIG. 1 is a block diagram showing one example of a configuration of a distance measuring device 1A in a first embodiment of the present technology. The distance measuring device 1A is a distance measuring sensor in which light is emitted from a light emitting element; light reflected from an object OBJ (a target object or an imaging object) is photoelectrically converted by a photoelectric conversion part; charge generated by the photoelectric conversion part is distributed by a plurality of transfer transistors to a plurality of charge accumulation parts; and on the basis of a charge amount accumulated in the plurality of charge accumulation parts, a distance up to the object OBJ is measured.

As shown therein, the distance measuring device 1A includes, for example, components such as a system control part 10, a light emitting part 20, a light emitting timing adjustment part 30, a light receiving part 40, and a distance measuring processing part 50. Although these components can be integrally configured as, for example, a system-on-chip (SoC) such as a CMOS LSI, for example, some of the components such as the light emitting part 20 and the light receiving part 40 may be configured as separate LSIs. The distance measuring device 1A operates in accordance with an operation clock, not shown. In addition, the distance measuring device 1A includes a communication interface part 60 for outputting data (distance measuring data) related to a distance calculated by the distance measuring processing part 50 outside. The distance measuring device 1A is configured to be operable to communicate with a host IC disposed outside via the communication interface part 60, although it is not shown. It is to be noted that an imaging device of the present technology is configured by at least the system control part 10 and the light receiving part 40.

The system control part 10 is a component which totally controls operation of the distance measuring device 1A. Typically, the system control part 10 includes a microprocessor.

The light emitting part 20 emits light such as infrared light (IR) toward a target area. The light emitting timing adjustment part 30 is a circuit which adjusts light emitting timing of the light emitting part 20. For example, the light emitting timing adjustment part 30 outputs a trigger pulse so as to synchronize reading timing for each line from the later-described light receiving part 40 and drives the light emitting part 20.

The light receiving part 40 is a sensor which outputs an electric signal in reaction with light incident from the target area. The incident light includes the light reflected from the object OBJ. In the present disclosure, the light receiving part 40 is a CMOS image sensor configured by a plurality of pixels which are arranged in a two-dimensional matrix manner and include a plurality of light receiving elements. In the present disclosure, for example, under control of the system control part 10, a specific group of pixels (for example, a group of pixels in a one-line direction in an imaging frame) is activated and thus, the electric signal is read. In addition, a group of pixels of each of lines is sequentially activated in one frame time, one imaging frame with respect to the target area is formed by electric signals outputted from respective activated groups of pixels.

The distance measuring processing part 50 is a component which on the basis of light emitted by the light emitting part 20 and observation light received by the light receiving part 40, calculates the distance up to the object OBJ. The distance measuring processing part 50 is configured by, typically, a signal processing processor. In the present disclosure, the distance measuring processing part 50 includes an analog-digital (AD) conversion part 51 and a distance computing circuit 52.

The AD conversion part 51 converts a pixel signal in accordance with a charge amount outputted from each of the pixels and accumulated from an analog signal to a digital signal. The pixel signal of each of the pixels is outputted to the distance computing circuit 52. On the basis of the pixel signal of each of the pixels, the distance computing circuit 52 calculates the distance up to the object OBJ. In the distance computing circuit 52, a distance image can be obtained by distances calculated with respect to all pixels constituting an imaging frame. The distance computing circuit 52 sequentially outputs data related to the distances calculated for the pixels in each of imaging frames (distance measuring data) to the communication interface part 60 and a region of interest (ROI) determination part 80.

The communication interface part 60 is an interface circuit for outputting the calculated distance measuring data to the host IC disposed outside. For example, although the communication interface part 60 is an interface circuit in conformity with a mobile industry processor interface (MIPI), the communication interface part 60 is not limited thereto. For example, the communication interface part 60 may be a serial peripheral interface (SPI), LVDS, SLVS-EC, or the like or some of these interface circuits may be mounted.

On the basis of the calculated distance measuring data, the ROI region determination part 80 determines a region of interest which includes, for example, the object OBJ. This determination result is outputted to the system control part 10. On the basis of the determination result of the region of interest by the ROI region determination part 80, the system control part 10 controls a pixel driving part 70, which is provided in the light receiving part 40, and a pixel modulation part 90A so as to execute switching control for two charge accumulation parts inside each of the pixels by switching frequencies which are different from each other between the region of interest and a region other than the region of interest. It is to be noted that when the pixel driving part 70 is controlled, the system control part 10 may use a V (vertical) control determination part 100 which determines skipping of a reading region or the like.

<Configuration of Light Receiving Part>

Figure 2:
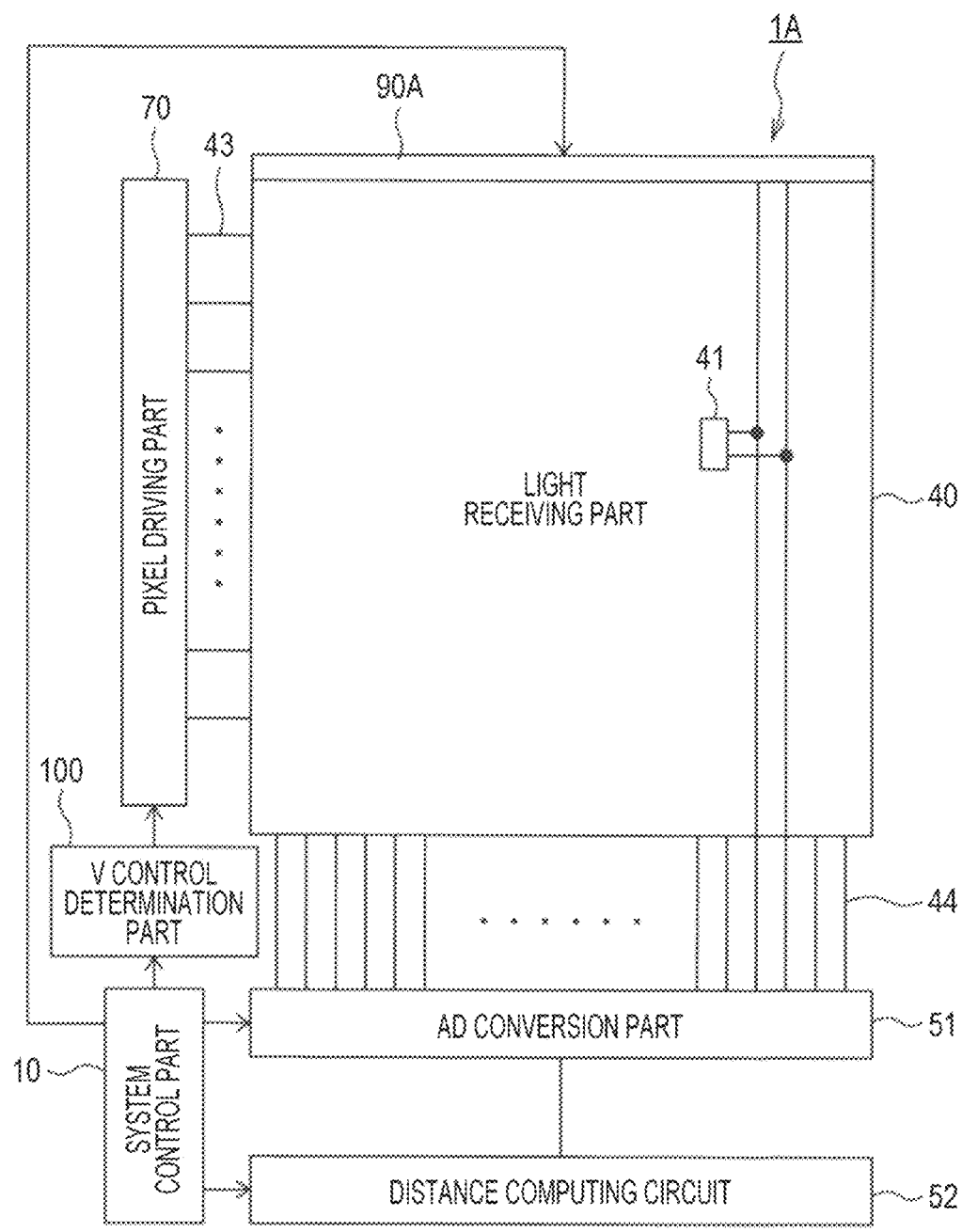
FIG. 2 is a block diagram showing details of a light receiving part of the distance measuring device in the first embodiment of the present technology.

FIG. 2 illustrates, as an example, one pixel 41 of the plurality of pixels arranged in the two-dimensional matrix manner in the light receiving part 40. The pixel 41 has a photoelectric conversion element which photoelectrically converts received light and generates charge in accordance with a light amount.

The pixel driving part 70 is connected to the light receiving part 40 via pixel driving lines 43. The pixel driving part 70 drives concurrently all the pixels of the light receiving part 40 or drives pixels per row or the like thereof. Pixel signals outputted from the pixels in a pixel line (pixel row), which is selected and scanned by the pixel driving part 70, are subjected to pixel modulation processing by the pixel modulation part 90A, and each of the processed pixel signals is supplied to the AD conversion part 51 through each of vertical signal lines 44.

For each pixel row of the light receiving part 40, the AD conversion part 51 converts, from an analog signal to a digital signal, each of the pixel signals outputted from each of pixel units of the selected line (selected row) through each of the vertical signal lines 44.

Here, in a case where in the pixel 41, charge is accumulated in the charge accumulation parts for a long period of time, although it is easy to obtain distance measurement information of a target object located at a long distance or a target object having low reflectance, the charge accumulation parts are easily saturated. In contrast to this, in a case where in the charge accumulation parts, charge is accumulated for a short period of time, the charge accumulation parts are hardly saturated due to reflected light of a target object at a short distance or a target object having high reflectance.

<Distance Measurement Method>

Figure 3:
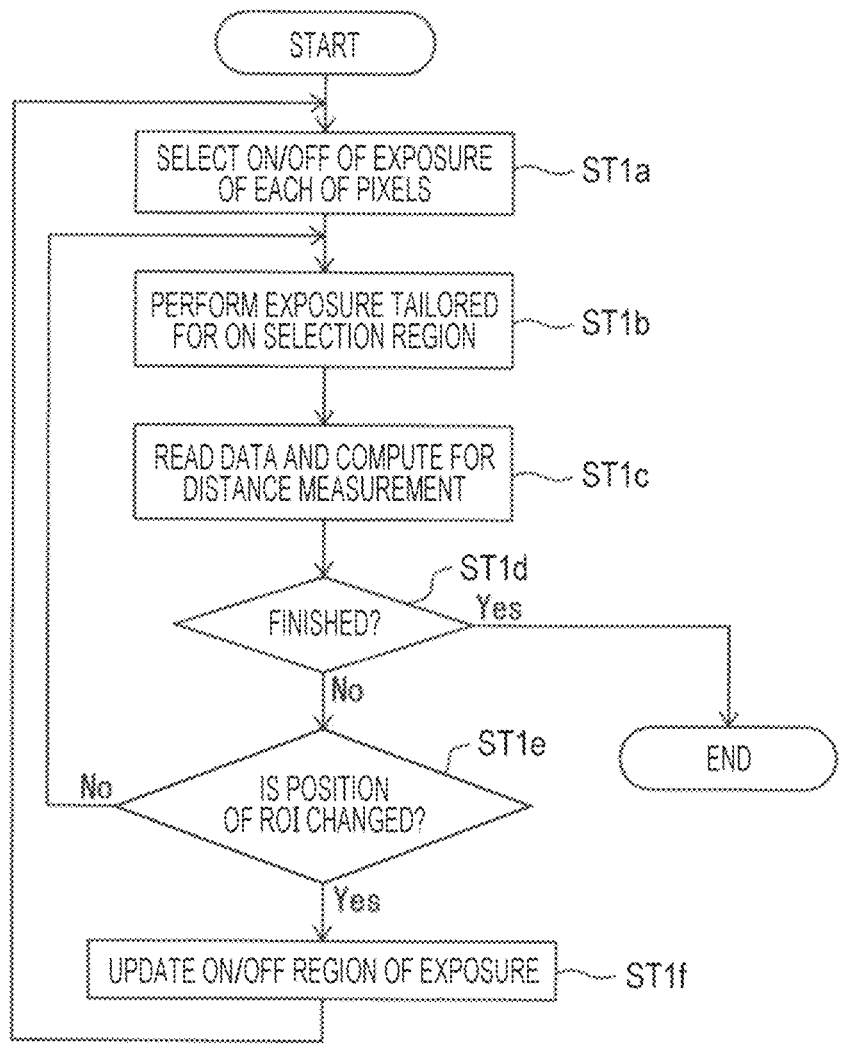
FIG. 3 is a flowchart for explaining a distance measurement method by the distance measuring device in the first embodiment of the present technology.

FIG. 3 is a flowchart for explaining a distance measurement method by a distance measuring device 1A in a first embodiment of the present technology.

In other words, when distance measurement processing is started, first, the distance measuring device 1A selects ON/OFF of exposure for each of the pixels (step ST1*a*). It is to be noted that in this step ST1*a*, an operation frequency of each of the pixels, that is, each of the switching frequencies of the charge accumulation parts may be selected.

Subsequently, the distance measuring device 1A performs exposure tailored for an ON selection region (step ST1*b*), reads data in the exposed region, and on the basis of the read data, calculates distance measuring data with respect to, for example, pixels of one frame (step ST1*c*).

Then, the distance measuring device 1A determines whether or not the processing is finished (step ST1*d*) and in a case where the processing is not finished (No), it is determined by the ROI region determination part 80 whether or not, from the calculated distance measuring data, an object OBJ which is the ROI is present and a position of the ROI is changed (step ST1*e*). For example, in a case where a signal indicating that the processing is finished is received from outside, the finishing processing here is finished. Here, when no change is made for the position of the ROI (No), the distance measuring device 1A proceeds to the above-mentioned processing in step ST1*b*. On the other hand, in a case where the position of the object OBJ which is the ROI is changed (Yes), the distance measuring device 1A controls the pixel modulation part 90A to update the ON/OFF region of the exposure with respect to pixels which correspond to the object OBJ (step ST1*f*) and proceeds to the above-mentioned processing in step ST1*a*. It is to be noted that in step ST1*f*, the distance measuring device 1A may control the pixel modulation part 90A and may change operation frequencies in the pixels corresponding to the object OBJ, that is, the switching frequencies of the charge accumulation parts to high frequencies. In addition, each of triggers of the change of the ON region of the exposure and the change of the switching frequencies of the charge accumulation parts other than the determination result by the ROI region determination part 80 may be, for example, image recognition using an external camera image or reception of a signal indicating that the object OBJ is present from outside. In this case, a switching frequency in a pixel area corresponding to the object OBJ is changed.

Furthermore, without changing the switching frequency of the pixel area by using the signal indicating that the object OBJ is present, the area may be previously cut and divided and frequencies in the divided areas may be determined and inputted.

In addition, returning to the above-mentioned processing in step ST1*d*, in a case where it is determined that the processing is finished (Yes), the distance measuring device 1A finishes the processing as it is.

Figure 4:
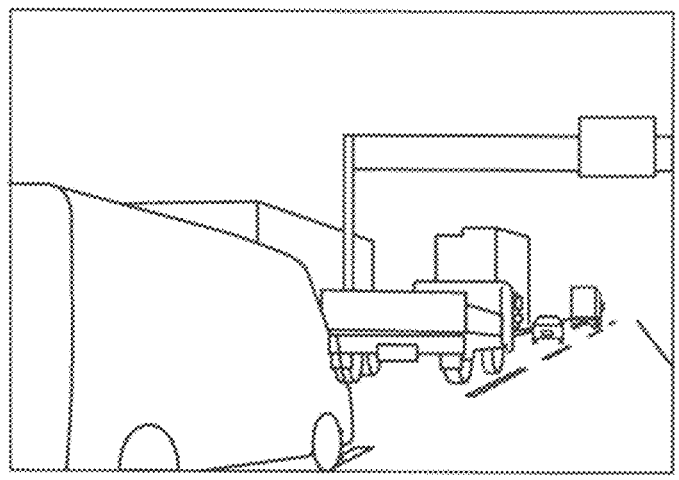
FIG. 4 is a diagram for explaining distance measurement processing during formation of an imaging frame by the distance measuring device in the first embodiment of the present technology.

As described above, as shown in FIG. 4, in accordance with a distance up to the object OBJ, which is previously measured by the pixels of the neighboring line, the distance measuring device 1A can appropriately change the switching frequencies of the charge accumulation parts in the pixels. In particular, in a case where as a result of the distance measurement, a distance up to the object OBJ is short, the switching frequencies thereof are changed to high switching frequencies so as to enable distance measurement at further high distance measurement accuracy. Thus, for example, in a scene in front of a vehicle, as to a nearby obstacle (for example, other vehicle), avoidance of collision or the like can be further accurately made by the distance measurement at the further high distance measurement accuracy. On the other hand, in a case where any obstacle (for example, other vehicle) is not present nearby, the switching frequencies thereof are changed to low switching frequencies so as to make distance measurement at further low distance measurement accuracy or the switching frequencies are switched to "zero", thereby allowing driving voltages of the pixels and a computing load of the processor to be reduced and enabling power consumption to be suppressed.

<Power Reduction at Time of Exposure>

Figure 5:
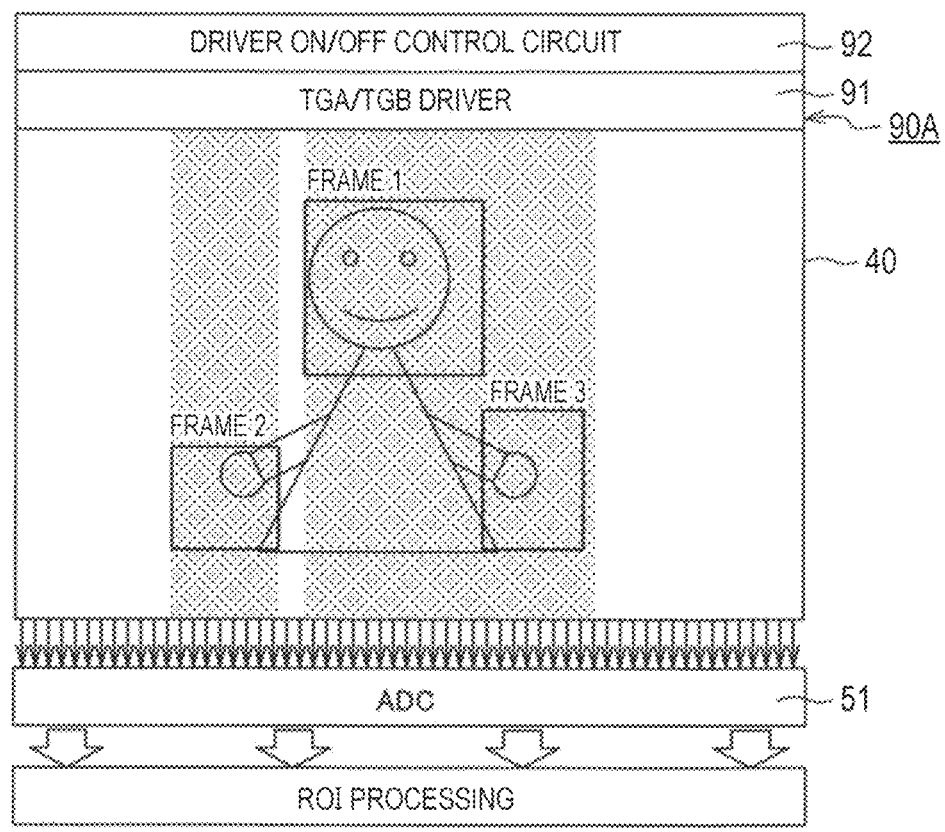
FIG. 5 is a block diagram showing one example of a case where data of only a ROI region is outputted in the first embodiment of the present technology.

FIG. 5 is a block diagram showing one example of a case where data is outputted only for the ROI region in the first embodiment of the present technology. In an example in FIG. 5, the pixel modulation part 90A includes a TGA/TGB driver 91 and a driver ON/OFF control circuit 92. The TGA/TGB driver 91 is to output transfer signals TGA and TGB for switching the charge accumulation parts inside the pixel 41. Under control by the system control part 10, the driver ON/OFF control circuit 92 controls the TGA/TGB driver 91 so as to switch the charge accumulation parts inside the pixel 41 for only the ROI region (in FIG. 5, for example, a frame 1, a frame 2, and a frame 3 are shown).

<Equivalent Circuit of Pixel>

Figure 6:
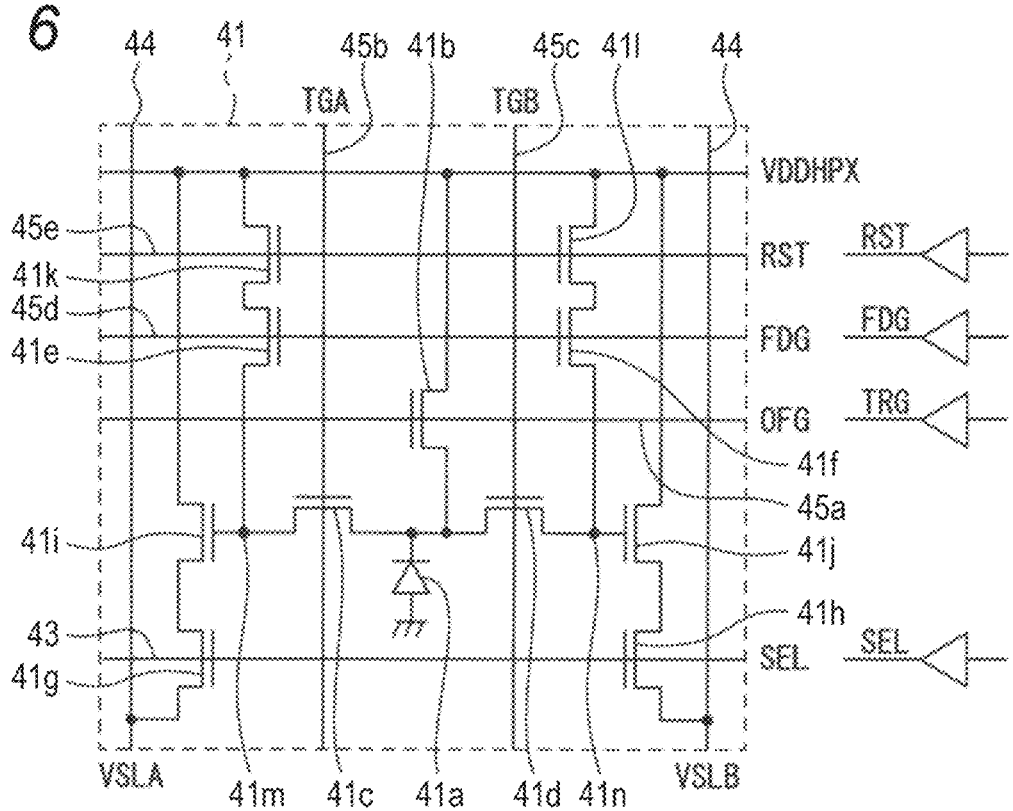
FIG. 6 shows an equivalent circuit of a pixel according to the first embodiment of the present technology.

FIG. 6 shows an equivalent circuit of the pixel 41. The pixel 41 includes a photodiode 41a, a discharge transistor 41b, transfer transistors 41c and 41d, conversion efficiency adjustment transistors 41e and 41f, selection transistors 41g and 41h, amplification transistors 41i and 41j, and reset transistors 41k and 41l. The discharge transistor 41b, the transfer transistors 41c and 41d, the conversion efficiency adjustment transistors 41e and 41f, the selection transistors 41g and 41h, the amplification transistors 41i and 41j, and the reset transistors 41k and 41l are configured by, for example, MOS transistors.

The photodiode 41a constitutes a photoelectric conversion part which photoelectrically converts incident light. An anode of the photodiode 41a is grounded. Sources of the transfer transistors 41c and 41d and a source of the discharge transistor 41b are connected to a cathode of the photodiode 41a.

A power source voltage VDDHPX is applied to a drain of the discharge transistor 41b. A discharge signal OFG is applied via a discharge control wire 45a to a gate of the discharge transistor 41b. On the basis of the discharge signal OFG, the discharge transistor 41b discharges charge of the photodiode 41a. It is to be noted that no discharge transistor 41b may be included.

Drains of the transfer transistors 41c and 41d are connected to charge accumulation parts 41m and 41n which are configured by floating diffusion regions (floating diffusion), respectively. The transfer signals TGA and TGB outputted from the TGA/TGB driver 91 are applied via control lines 45b and 45c to gates of the transfer transistors 41c and 41d, respectively. On the basis of the transfer signals TGA and TGB, the transfer transistors 41c and 41d transfer charge from the photodiode 41a to the charge accumulation parts 41m and 41n, respectively.

The charge accumulation parts 41m and 41n accumulate the charge transferred via the transfer transistors 41c and 41d from the photodiode 41a. In accordance with the charge amount accumulated in the charge accumulation parts 41m and 41n, potentials of the charge accumulation parts 41m and 41n are modulated.

Sources of the conversion efficiency adjustment transistors 41e and 41f are connected to the charge accumulation parts 41m and 41n, respectively. Drains of the conversion efficiency adjustment transistors 41e and 41f are connected to sources of the reset transistors 41k and 41l, respectively. A common conversion efficiency adjustment signal FDG is applied via a conversion efficiency adjustment wire 45d to gates of the conversion efficiency adjustment transistors 41e and 41f. In accordance with the conversion efficiency adjustment signal FDG, the conversion efficiency adjustment transistors 41e and 41f adjust conversion efficiency of the charge. It is to be noted that no conversion efficiency adjustment transistors 41e and 41f may be included. In such a case, the sources of the reset transistors 41k and 41l are connected to the charge accumulation parts 41m and 41n, respectively.

The power source potential VDDHPX is applied to drains of the reset transistors 41k and 41l. A reset signal RST is applied via a common reset control wire 45e to gates of the reset transistors 41k and 41l. On the basis of the reset signal RST, the reset transistors 41k and 41l initialize (reset) the charge accumulated in the charge accumulation parts 41m and 41n. It is to be noted that instead of providing the individually connected reset transistors 41k and 41l for the charge accumulation parts 41m and 41n, one reset transistor which is connected commonly to the charge accumulation parts 41m and 41n may be provided.

Gates of the amplification transistors 41i and 41j are connected to the charge accumulation parts 41m and 41n. Sources of the selection transistors 41g and 41h are connected to drains of the amplification transistors 41i and 41j. The amplification transistors 41i and 41j amplify the potentials of the charge accumulation parts 41m and 41n.

Drains of the selection transistors 41g and 41h are connected to the vertical signal lines 44, respectively. A selection signal SEL is applied via the pixel driving lines 43 to gates of the selection transistors 41g and 41h. On the basis of the selection signal SEL, the selection transistors 41g and 41h select the pixel 41. In a case where the pixel 41 is selected, pixel signals VSLA and VSLB in accordance with potentials amplified by the amplification transistors 41i and 41j are outputted via the vertical signal lines 44.

In the accumulation time of the charge of the pixel 41 in each of the frames, in order to apply a L (low) level as the reset signal RST to the gates of the reset transistors 41k and 41l, the reset transistors 41k and 41l come to be in a non-conduction state. In addition, as the transfer signals TGA and TGB, an H level and an L level are repeated in an opposite phase and are applied to the gates of the transfer transistors 41c and 41d. A phase of the transfer signal TGA is, for example, the same phase as that of a light emitting pattern of the light emitting part 20, and a phase of the transfer signal TGB is a phase opposite to that of the light emitting pattern of the light emitting part 20. A conduction state and a non-conduction state of the transfer transistors 41c and 41d are repeated in an opposite phase, thereby distributing the charge to the charge accumulation parts 41m and 41n.

In a reading period, in order to apply L levels as the transfer signals TGA and TGB to the gates of the transfer transistors 41c and 41d, the transfer transistors 41c and 41d come to be in a non-conduction state. At this time, as the selection signal SEL, an H level is applied to the gates of the selection transistors 41g and 41h. The selection transistors 41g and 41h come to be in a conduction state, charge amounts of the charge accumulation parts 41m and 41n are read, and pixel signals in accordance with the charge amounts are outputted to the distance measuring processing part 50 shown in FIG. 1.

With reference back to FIG. 5, in a case where the control lines 45b and 45c of the transfer signals TGA and TGB are common in a vertical direction (V direction), the driver ON/OFF control circuit 92 controls the TGA/TGB driver 91 so as to perform switching of the transfer signals TGA and TGB only for a pixel 41 in which the ROI region (in FIG. 5, the frame 1, the frame 2, and the frame 3) is present in the V direction. Accordingly, power consumption of the whole distance measuring device 1A can be suppressed.

Modified Example of Power Reduction at Time of Exposure

Figure 7:
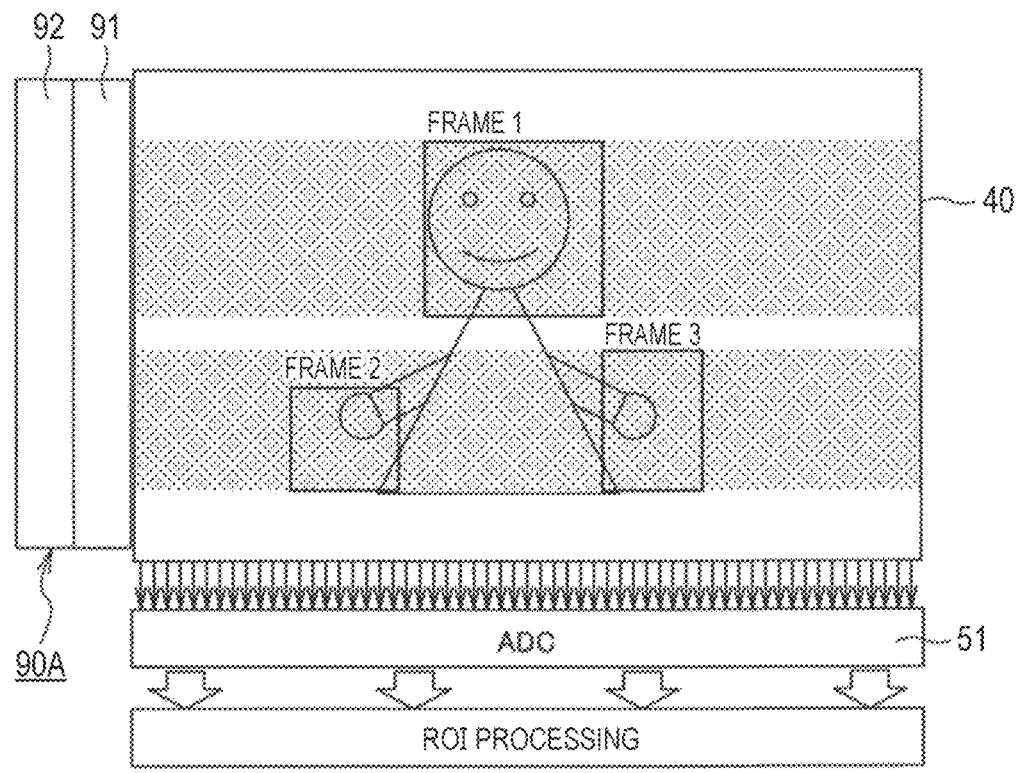
FIG. 7 is a block diagram showing one example of a case where data of only a ROI region is outputted in a first modified example of the first embodiment of the present technology.

FIG. 7 is a block diagram showing one example of a case where data is outputted only for a ROI region in a first modified example of the first embodiment of the present technology.

In an example in FIG. 7, a case where the control lines 45b and 45c of the transfer signals TGA and TGB are common in a horizontal direction (H direction). Even in this first modified example, in a case where the control lines 45b and 45c of the transfer signals TGA and TGB are common in the H direction, the driver ON/OFF control circuit 92 controls the TGA/TGB driver 91 so as to perform switching of the transfer signals TGA and TGB only for a pixel 41 in which a ROI region (in FIG. 7, a frame 1, a frame 2 and a frame 3) is present in the H direction. Accordingly, power consumption of the whole distance measuring device 1A can be suppressed.

Another Modified Example of Power Reduction at Time of Exposure

Figure 8:
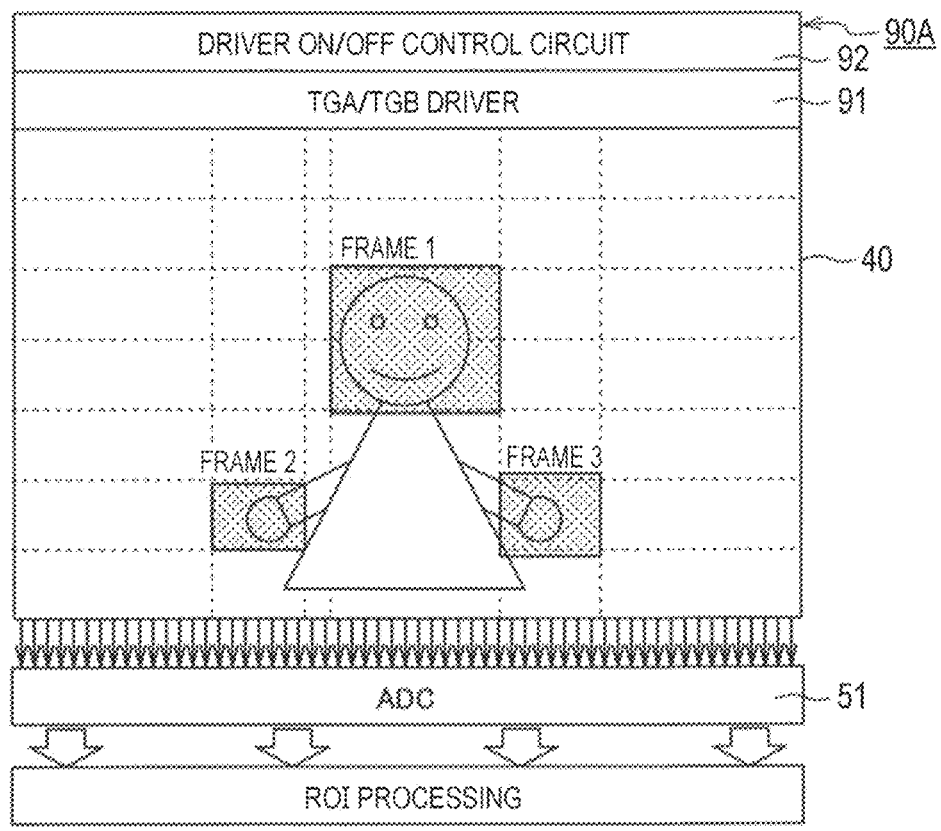
FIG. 8 is a block diagram showing one example of a case where data of only a ROI region is outputted in a second modified example of the first embodiment of the present technology.

FIG. 8 is a block diagram showing one example of a case where data is outputted only for a ROI region in a second modified example of the first embodiment of the present technology.

In an example in FIG. 8, the control lines 45b and 45c in a V direction may be divided to a plurality of regions in a unit of a plurality of pixels in the V direction, and it may be thereby made possible to enable ON/OFF switching of the transfer signals TGA and TGB in small regions. It is to be noted that the control lines 45b and 45c in an H direction may be divided.

Operation and Effect of First Embodiment

As described above, according to the above-described first embodiment, in the pixel modulation part 90A, switching frequencies which switch the charge accumulation parts 41m and 41n can be made different from each other in each of pixel regions of an imaging frame. Thus, in a case where pixel regions for which distances are desired to be measured at a high speed is one part of the imaging frame, it is made possible to designate the pixel regions, for which the distances are desired to be measured at the high speed, as a plurality of frames which are a frame 1, a frame 2, and a frame 3, and the switching control of the charge accumulation parts 41m and 41n are executed only for the regions which are desired to be read by higher switching frequencies than those for other regions, thereby allowing power to be reduced.

In addition, according to the above-described first embodiment, only in the ROI region for which the data is outputted, the switching of the transfer signals TGA and TGB which are supplied to the gates of the transfer transistors 41c and 41d, respectively is performed, thereby allowing power consumption to be suppressed.

Furthermore, according to the above-described first embodiment, since the ROI region determination part 80 is provided in the distance measuring device 1A, the switching control of the charge accumulation parts 41m and 41n can be executed for each of the pixel regions of the imaging frame.

Second Embodiment

Next, a second embodiment will be described. A second embodiment is a modification of the first embodiment, and a case where data of the entire imaging frame is read will be described.

Figure 9:
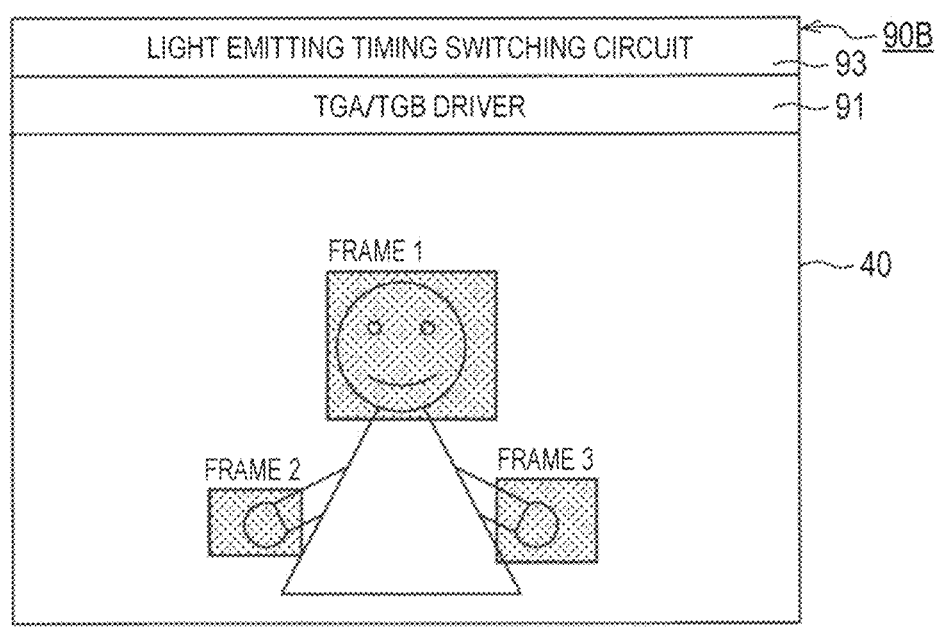
FIG. 9 is a block diagram showing one example of a case where whole area data is outputted in a second embodiment of the present technology.

FIG. 9 is a block diagram showing one example of a case where whole area data is outputted in the second embodiment of the present technology. In an example in FIG. 9, a pixel modulation part 90B includes a TGA/TGB driver 91 and a light emitting timing switching circuit 93. On the basis of ROI region information outputted from a system control part 10, the light emitting timing switching circuit 93 controls the TGA/TGB driver 91 so as to perform switching of charge accumulation parts 41m and 41n in a pixel 41 for a ROI region (in FIG. 9, for example, a frame 1, a frame 2, and a frame 3 are shown) at a high speed (for example, 100 MHz) and to perform switching of the charge accumulation parts 41m and 41n in the pixel 41 by low frequencies (for example, 50 MHz) for regions other than the ROI region.

In the second embodiment, a light emitting timing adjustment part 30 generates light emitting timings for a plurality of frequencies and outputs the light emitting timings to the pixel modulation part 90B. From the ROI region information outputted from the system control part 10, the pixel modulation part 90B selects whether pulses of the light emitting timings (frequencies) are used.

Next, with reference to a timing chart in FIG. 10, a distance measuring method according to the second embodiment will be described by focusing on outsides of the frames and insides of the frames of the ROI.

Figure 10:
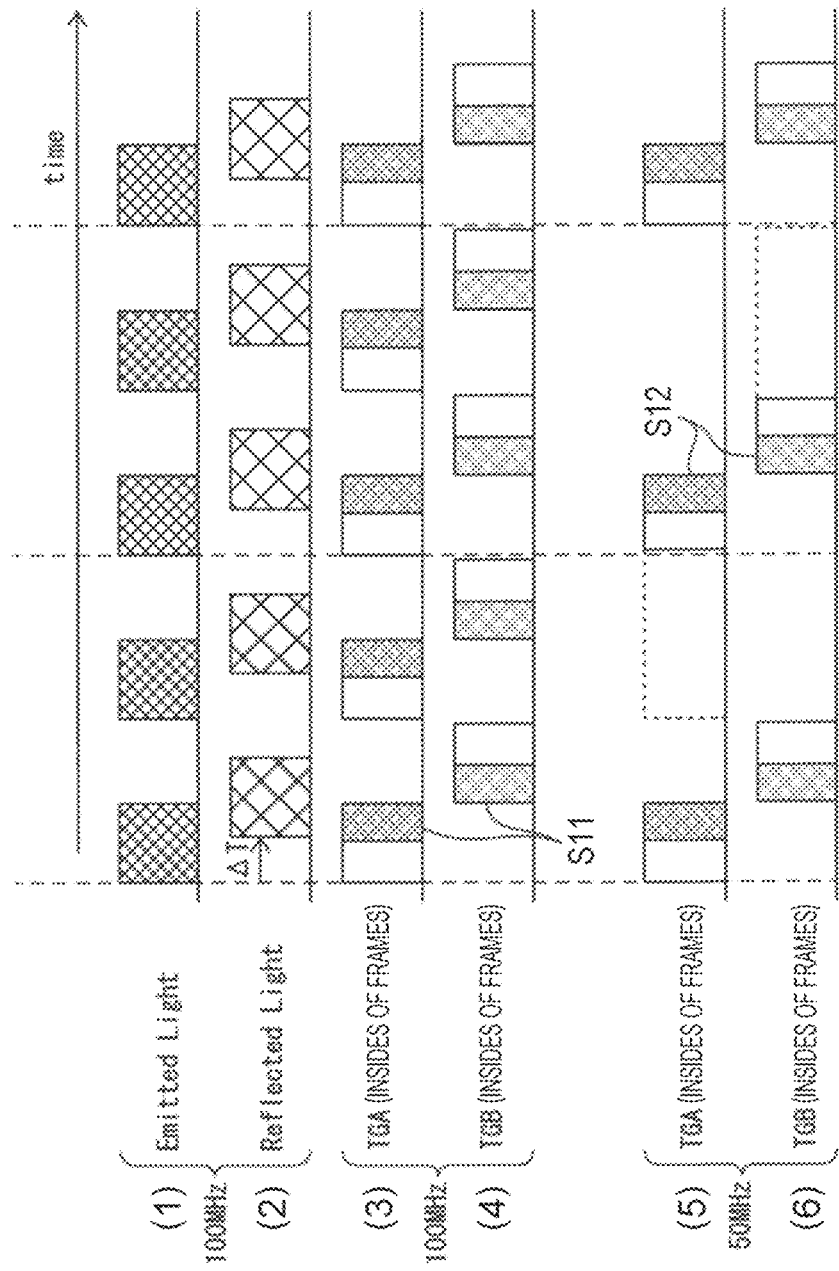
FIG. 10 is a timing chart of a distance measuring method according to the second embodiment of the present technology.

A light emitting part 20 emits irradiation light which is modulated so as to repeat ON/OFF of radiation at predetermined light emitting timing (for example, 100 MHz) (FIG. 10(1)). In a photodiode 41a in the pixel 41, reflected light is received, with the reception delayed by delay time ($\Delta$T) in accordance with a distance up to an object OBJ (FIG. 10(2))

In the accumulation time of the charge of the pixel 41 in each of the frames, in order to apply a L (low) level as the reset signal RST to the gates of the reset transistors 41k and 41l, the reset transistors 41k and 41l come to be in a non-conduction state. In addition, as the transfer signals TGA and TGB, an H level and an L level are repeated in an opposite phase and are applied to the gates of the transfer transistors 41c and 41d. A phase of the transfer signal TGA is, for example, the same as that of a light emitting pattern of the light emitting part 20 (FIG. 10(3)), and a phase of the transfer signal TGB is a phase opposite to that of the light emitting pattern of the light emitting part 20 (FIG. 10(4)). Each of the transfer transistors 41c and 41d repeats the conduction state and the non-conduction state at, for example, a switching frequency of 100 MHz, thereby distributing the charge to the charge accumulation parts 41m and 41n.

In a reading period, in order to apply L levels as the transfer signals TGA and TGB to the gates of the transfer transistors 41c and 41d, the transfer transistors 41c and 41d come to be in a non-conduction state. At this time, as the selection signal SEL, an H level is applied to the gates of the selection transistors 41g and 41h. The selection transistors 41g and 41h come to be in a conduction state, charge amounts of the charge accumulation parts 41m and 41n are read, and pixel signals S11 (in FIG. 10(3) and FIG. 10(4), dotted areas) in accordance with the charge amounts are outputted to a distance measuring processing part 50 shown in FIG. 1.

In charge accumulation time in the pixel 41 outside each of the frames, in order to apply the L level as the reset signal RST to the gates of the reset transistors 41k and 41l, the reset transistors 41k and 41l come to be in the non-conduction state. In addition, as the transfer signals TGA and TGB, an H level and an L level are repeated in an opposite phase and are applied to the gates of the transfer transistors 41c and 41d. A phase of the transfer signal TGA is, for example, the same as that of a light emitting pattern of the light emitting part 20 (FIG. 10(5)), and a phase of the transfer signal TGB is a phase opposite to that of the light emitting pattern of the light emitting part 20 (FIG. 10(6)). Each of the transfer transistors 41c and 41d repeats the conduction state and the non-conduction state at, for example, a switching frequency of 50 MHz, thereby distributing the charge to the charge accumulation parts 41m and 41n.

In a reading period, in order to apply L levels as the transfer signals TGA and TGB to the gates of the transfer transistors 41c and 41d, the transfer transistors 41c and 41d come to be in a non-conduction state. At this time, as the selection signal SEL, an H level is applied to the gates of the selection transistors 41g and 41h. The selection transistors 41g and 41h come to be in the conduction state, charge amounts of the charge accumulation parts 41m and 41n are read, and pixel signals S12 (in FIG. 10(5) and FIG. 10(6), dotted areas) in accordance with the charge amounts are outputted to the distance measuring processing part 50 shown in FIG. 1.

Operation and Effect of Second Embodiment

As described above, according to the above-described second embodiment, also in the case where in the pixel modulation part 90B, the whole area data of the imaging frame is read, a speed at which the transfer signals TGA and TGB are switched is made variable for each of the regions, and as to the ROI region (the frame 1, the frame 2, and the frame 3) for which highly accurate information is desired, the transfer signals TGA and TGB are switched at a high speed and as to regions (outside the frames) for which accuracy may be low, the speed at which the transfer signals TGA and TGB are switched is reduced, thereby allowing power of a distance measuring device 1A as a whole to be reduced.

Third Embodiment

Next, a third embodiment will be described. The third embodiment is a modification of the first embodiment, and specific configurations of a TGA/TGB driver 91 and a driver ON/OFF control circuit 92 will be described.

Figure 11:
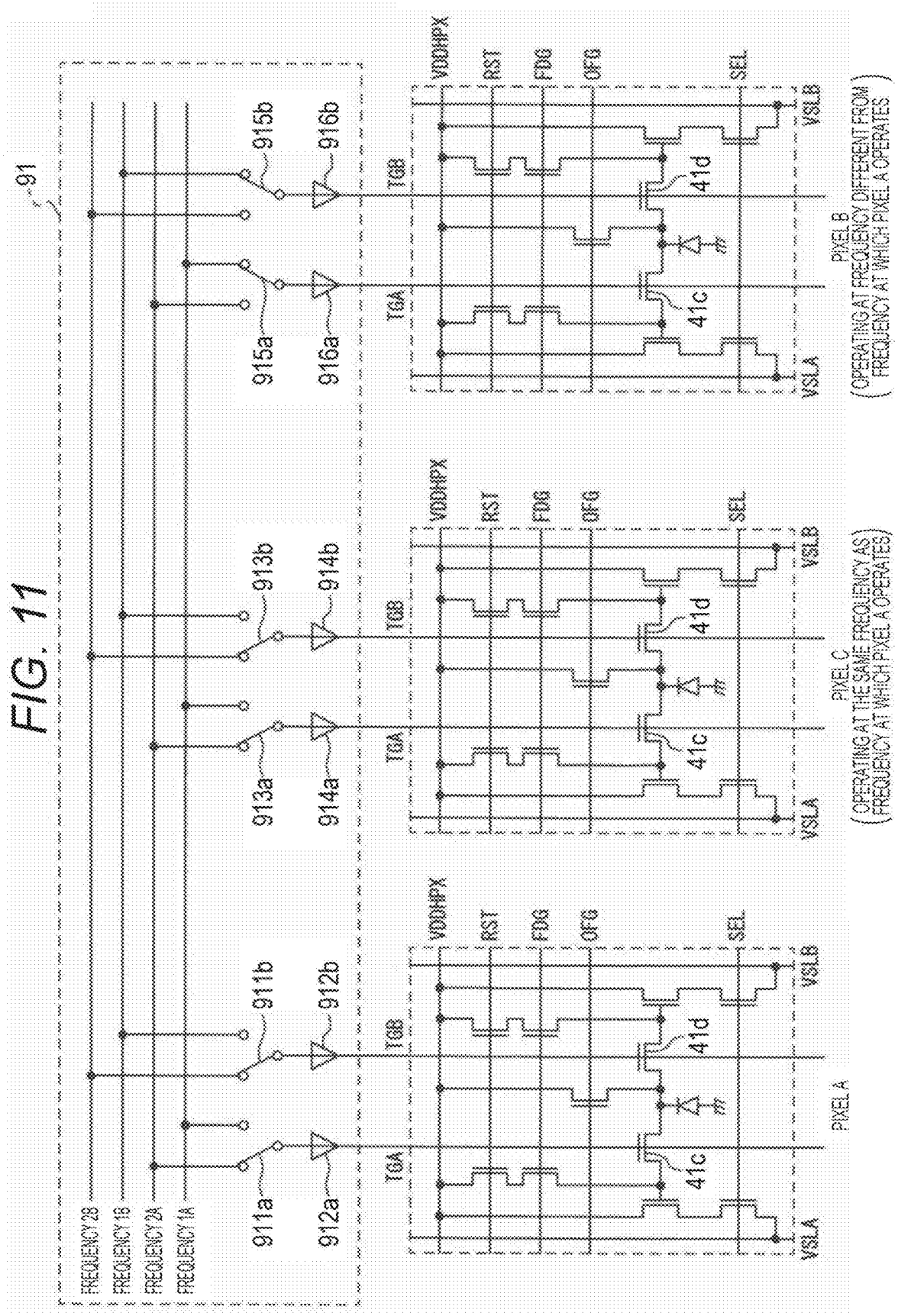
FIG. 11 is a block diagram showing one example of a TGA/TGB driver in a third embodiment of the present technology.

FIG. 11 is a block diagram showing one example of the TGA/TGB driver 91 in the third embodiment of the present technology.

In FIG. 11, the TGA/TGB driver 91 includes: for example, a switch 911a which performs switching between a signal of a frequency 1A (100 MHz) and a signal of a frequency 2A (50 MHz) for a pixel 41 (which is a pixel A in FIG. 11) which corresponds to a frame 2; a driver 912a which amplifies the signal outputted from the switch 911a to a transfer signal TGA and outputs the transfer signal TGA to a transfer transistor 41c; a switch 911b which performs switching between a signal of a frequency 1B (100 MHz) and a signal of a frequency 2B (50 MHz) for the pixel A; and a driver 912b which amplifies the signal outputted from the switch 911b to a transfer signal TGB and outputs the transfer signal TGB to a transfer transistor 41d.

In addition, the TGA/TGB driver 91 includes: for example, a switch 913a which performs switching between a signal of a frequency 1A (100 MHz) and a signal of a frequency 2A (50 MHz) for a pixel 41 (which is a pixel C in FIG. 11) which corresponds to a frame 1; a driver 914a which amplifies the signal outputted from the switch 913a to a transfer signal TGA and outputs the transfer signal TGA to a transfer transistor 41c; a switch 913b which performs switching between a signal of a frequency 1B (100 MHz) and a signal of a frequency 2B (50 MHz) for the pixel C; and a driver 914b which amplifies the signal outputted from the switch 913b to a transfer signal TGB and outputs the transfer signal TGB to a transfer transistor 41d.

Furthermore, the TGA/TGB driver 91 includes: for example, a switch 915a which performs switching between a signal of a frequency 1A (100 MHz) and a signal of a frequency 2A (50 MHz) for a pixel 41 (which is pixel B in FIG. 11) which corresponds to a frame 3; a driver 916a which amplifies the signal outputted from the switch 915a to a transfer signal TGA and outputs the transfer signal TGA to a transfer transistor 41c; a switch 915b which performs switching between a signal of a frequency 1B (100 MHz) and a signal of a frequency 2B (50 MHz) for the pixel C; and a driver 916b which amplifies the signal outputted from the switch 915b to a transfer signal TGB and outputs the transfer signal TGB to a transfer transistor 41d.

Although normally, the pixels A to C operate at the frequency 1A and the frequency 1B, in a case where it is desired that a distance up to only the pixel B is measured at a high speed, the driver ON/OFF control circuit 92 switches the switch 911a for the pixel A to a side of the frequency 2A and switches the switch 911b therefor to a side of the frequency 2B. Then, the driver ON/OFF control circuit 92 switches the switch 913a for the pixel C to a side of the frequency 2A and switches the switch 913b therefor to a side of the frequency 2B.

It is to be noted that the driver ON/OFF control circuit 92 keeps a state in which the switch 915a for the pixel B is switched to a side of the frequency 1A and the switch 915b therefor is switched to a side of the frequency 1B.

Figure 12:
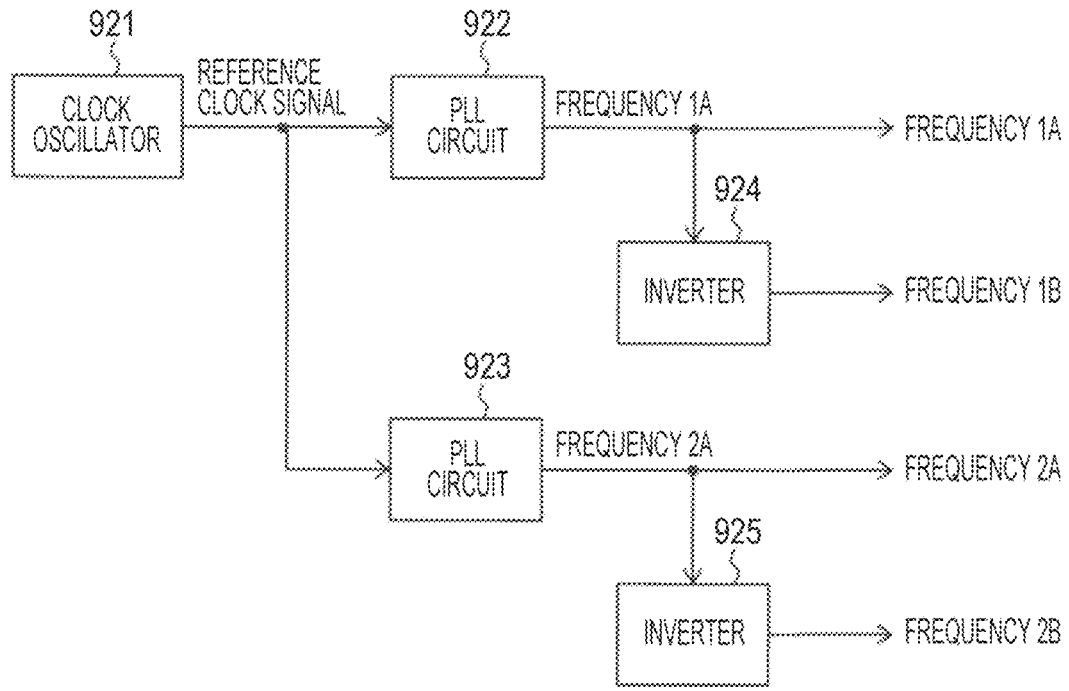
FIG. 12 is a block diagram showing one example of a driver ON/OFF control circuit in the third embodiment of the present technology.

FIG. 12 is a block diagram showing one example of the above-mentioned driver ON/OFF control circuit 92. In order to avoid mutual influence of the signals of the frequencies 1A, 1B, 2A, and 2B, the driver ON/OFF control circuit 92 performs synchronization processing of the frequencies 1A, 1B, 2A, and 2B.

A reference clock signal generated from a clock oscillator 921 is inputted to phased lock loop (PLL) circuits 922 and 923. The PLL circuit 922 performs PLL processing with the reference clock signal as reference, thereby generating the signal of the frequency 1A (100 MHz). An inverter 924 generates a signal of the frequency 1B in an opposite phase from the signal of this frequency 1A.

The PLL circuit 923 performs PLL processing with a reference clock signal as reference, thereby generating the signal of the frequency 2A (50 MHz). An inverter 925 generates the signal of the frequency 1B in an opposite phase from the signal of this frequency 2A.

Operation and Effect of Third Embodiment

As described above, according to the above-described third embodiment, operation and effect which are similar to those in the above-described first embodiment can be obtained.

Fourth Embodiment

Next, a fourth embodiment will be described. The fourth embodiment is a modification of the second embodiment, and other specific configuration of a light emitting timing switching circuit 93 will be described.

Figure 13:
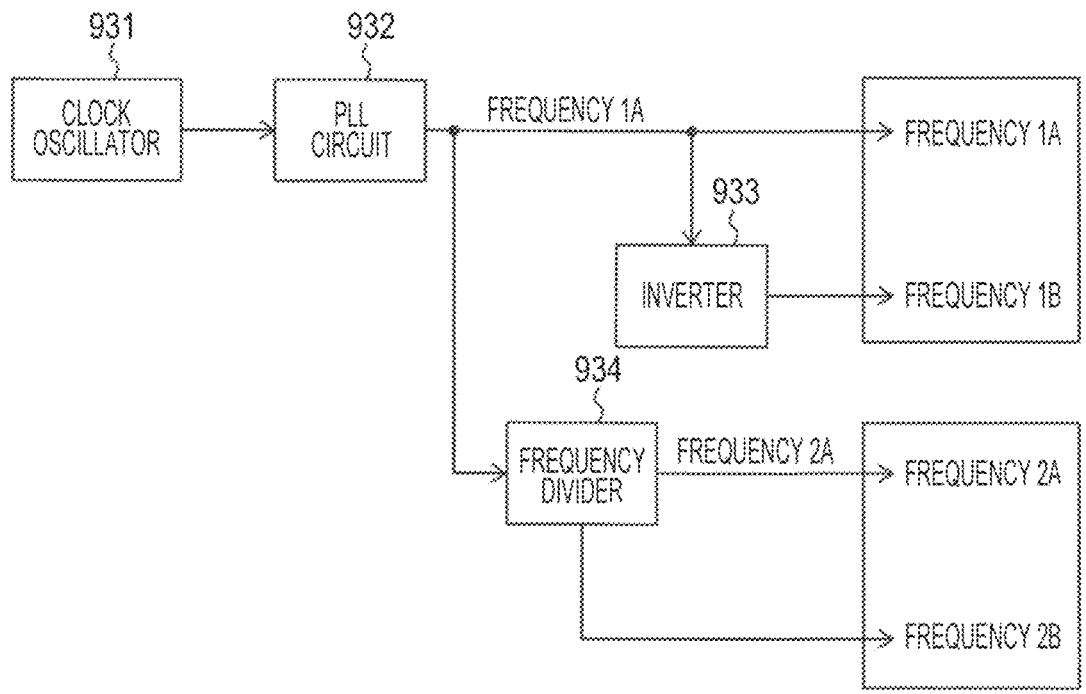
FIG. 13 is a block diagram showing one example of a light emitting timing switching circuit in a fourth embodiment of the present technology.

FIG. 13 is a block diagram showing one example of the above-mentioned light emitting timing switching circuit 93. A reference clock signal generated from a clock oscillator 931 is inputted to a PLL circuit 932. The PLL circuit 932 performs PLL processing with a reference clock signal as reference, thereby generating a signal of a frequency 1A (100 MHz). An inverter 933 generates a signal of a frequency 1B in an opposite phase from the signal of this frequency 1A.

On the other hand, a frequency of the signal of the frequency 1A is reduced to, for example, ½ by a frequency divider 934, and a signal of a frequency 2A (50 MHz) is generated. The frequency divider 934 has a function of an inverter, and a signal of a frequency 2B in an opposite phase is generated from the signal of the frequency 2A (50 MHz) and is outputted.

Operation and Effect of Fourth Embodiment

As described above, according to the above-described fourth embodiment, operation and effect which are similar to those in the above-described second embodiment can be obtained. Furthermore, according to the above-described fourth embodiment, only by changing a frequency dividing ratio of the frequency divider 934, the light emitting timing switching circuit 93 can be realized by a simple circuit configuration, as compared with a case where another PLL circuit is provided. As described above, on a side of the low frequency, the frequency divider 934 is used, thereby making it possible to capture images on sides of the low frequencies.

Fifth Embodiment

Next, a fifth embodiment will be described. The fifth embodiment is a modification of the fourth embodiment, and other specific configuration of a light emitting timing switching circuit 93 will be described.

Figure 14:
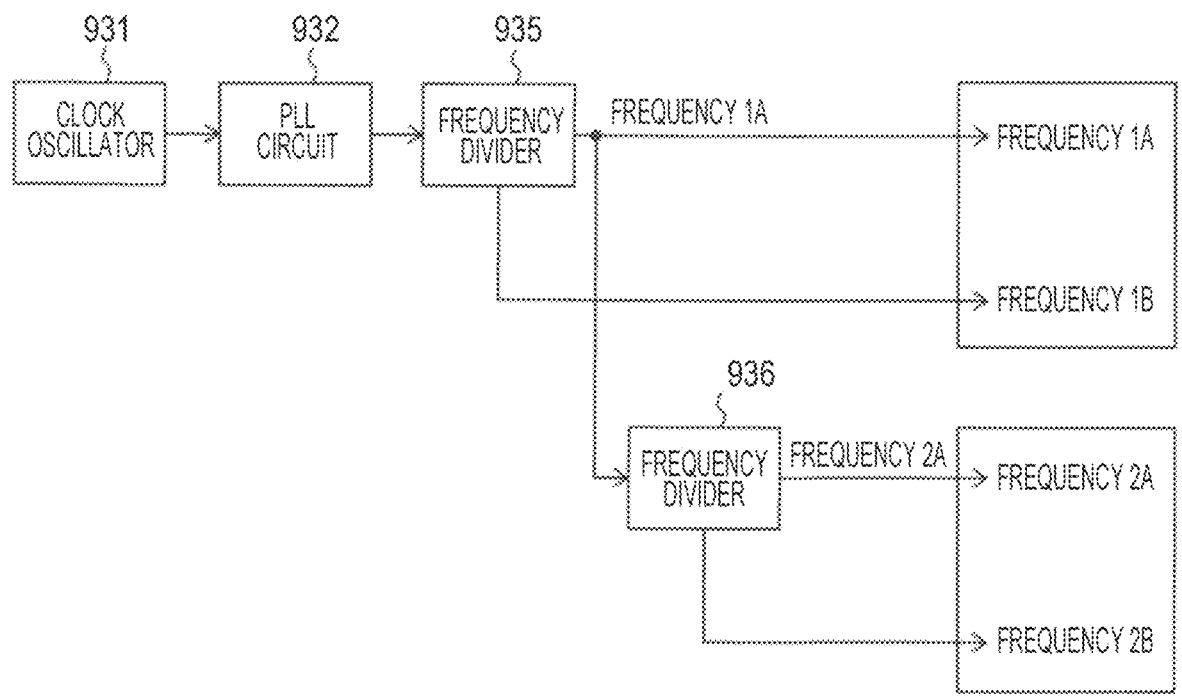
FIG. 14 is a block diagram showing one example of a light emitting timing switching circuit in a fifth embodiment of the present technology.

FIG. 14 is a block diagram showing another example of the above-described light emitting timing switching circuit 93. In FIG. 14, the same components as those shown in the above-mentioned FIG. 13 are denoted by the same reference signs, and detailed description therefor will be omitted.

A frequency divider 935 subjects output of a PLL circuit 932 to frequency division, thereby generating a signal of a frequency 1A (100 MHz). In addition, the frequency divider 935 has a function of an inverter, and a signal of a frequency 1B in an opposite phase is generated from the signal of the frequency 1A (100 MHz) and is outputted.

On the other hand, a frequency of the signal of the frequency 1A is reduced to, for example, ½ by a frequency divider 936, thereby generating a signal of a frequency 2A (50 MHz). The frequency divider 936 has a function of an inverter, and a signal of a frequency 2B in an opposite phase is generated from the signal of the frequency 2A (50 MHz) and is outputted.

In the fifth embodiment, in a case where a switching pulse of 100 MHz is generated from a clock of the PLL circuit 932 of, for example, one GHz, a frequency division ratio of the frequency divider 935 is changed to 1:9 to 5:5 to 9:1, thereby allowing a high/low period of the pulse to be changed.

It is to be noted that as to the signal of the frequency 2A (50 MHz), frequency division of output of the PLL circuit 932 or the pulse subjected to the frequency division by the frequency divider 935 may be collectively performed.

Operation and Effect of Fifth Embodiment

As described above, according to the above-described fifth embodiment, operation and effect which are similar to those in the above-described second embodiment can be obtained. Furthermore, according to the above-described fifth embodiment, only by changing the frequency division ratio of the frequency divider 935, as to the signals of the high-speed frequencies 1A and 1B, the high/low period of the pulse can be changed.

Sixth Embodiment

Next, a sixth embodiment will be described. Disclosed in the sixth embodiment is a distance measuring device 1B which includes a distance measuring processing part 53 configured by eliminating the above-described distance computing circuit 52 from the above-described distance measuring processing part 50 and makes it possible to determine a ROI region by using an external host IC which has received distance measuring data calculated by the distance measuring processing part 53. Here, the term of the external host IC is used to mean that the external host IC is provided outside the distance measuring device 1B as a SoC described in the above-described first embodiment.

Figure 15:
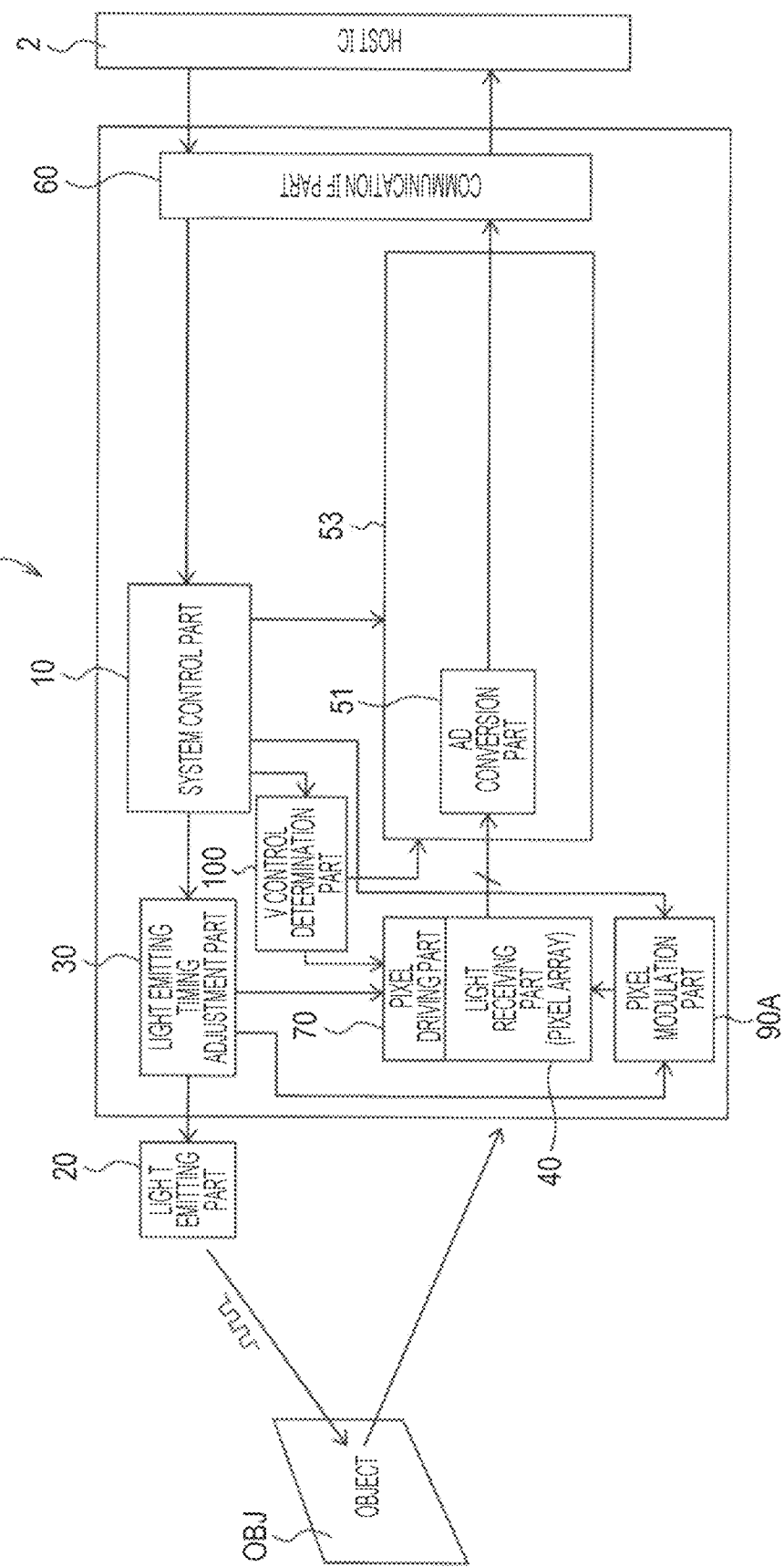
FIG. 15 is a block diagram showing one example of a configuration of a distance measuring device in a sixth embodiment of the present technology.

FIG. 15 is a block diagram showing one example of a configuration of the distance measuring device 1B in the sixth embodiment of the present technology. As shown therein, the configuration in the distance measuring device 1B in the sixth embodiment is different from the configuration of the distance measuring device 1A in the above-described first embodiment in that on the basis of distance measuring data received via a communication interface part 60 from the distance measuring processing part 53, the host IC 2 executes processing by the above-described distance computing circuit 52 and determines the ROI region. It is to be noted that in FIG. 15, the components having the same functions and configurations, which have already been shown in the drawings, are denoted by the same reference signs, and the description therefor will be appropriately omitted.

As shown therein, in the present embodiment, instead of the distance computing circuit 52 shown in FIG. 1 and the ROI region determination part 80 shown in FIG. 1, which are provided in the distance measuring device 1A, a distance computing circuit 52 and a ROI region determination part 80 are provided in the host IC 2. The host IC 2 includes a corresponding communication interface part, although the communication interface part is not shown. As in the above-described first embodiment, a distance computing circuit of the host IC 2 receives the distance measuring data via the communication interface part 60 from the distance measuring processing part 53 and thereupon, calculates a distance up to an object OBJ. Then, on the basis of the distance measuring data, the ROI region determination part of the host IC 2 determines a ROI region. The ROI region determination part of the host IC 2 transmits a determination result via the communication interface part 60 to a system control part 10.

As one example, the host IC 2 can include a frame buffer (not shown) which can retain distance measuring data for one imaging frame. The ROI region determination part of the host IC 2 references the frame buffer and determines a ROI region for each readout line of a subsequent imaging frame.

Operation and Effect of Sixth Embodiment

As described above, the above-described sixth embodiment can also exhibit operation and effect or advantages, which are similar to those in the above-described first embodiment. In addition, according to the above-described third embodiment, because in the distance measuring device 1B, the processing by the distance computing circuit and determination processing of the ROI region can be omitted, sophisticated processing can be performed. In particular, during formation of a current imaging frame, on the basis of the determination result of the ROI region, switching control of charge accumulation parts 41m and 41n can be executed.

Other Embodiments

Although as described above, the present technology is described by the first to sixth embodiments, it should not be construed that the description and the drawings which constitute one part of this disclosure limit the present technology. By understanding the spirit of the technological contents disclosed by the above-described embodiments, it shall become clear for those skilled in the art that various alternative embodiments, practical examples, and operation technologies can be embraced in the present technology. In addition, the configurations disclosed by the first to sixth embodiments and the modified examples of the first to sixth embodiments can be appropriately combined in the scope in which no inconsistency is produced. For example, the configurations which a plurality of different embodiments respectively disclose may be combined, or the configuration which a plurality of different modified examples of the same embodiments may be combined.

It is to be noted that the present disclosure can have the below-described configurations.

(1)
An imaging device including:
a plurality of pixels that are arranged in a matrix manner and receive reflected light from a target region, each of the plurality of pixels having a light receiving element that outputs an electric signal based on charge being accumulated in either one of first and second charge accumulation parts in accordance with the reflected light; and
a control part that executes switching control of the first and second charge accumulation parts by switching frequencies for each pixel region being constituted of a pixel group of at least one part of an imaging frame being formed by the plurality of pixels, the switching frequencies being different from each other.

(2)
The imaging device described in the (1), further including:
an analog/digital conversion part that converts the electric signal being outputted for each of the pixels from an analog signal to a digital signal; and
a distance calculation part that calculates a distance up to a region of interest of the imaging frame from output of the analog/digital conversion part.

(3)
The imaging device described in the (1), in which
the light receiving element includes first and second transfer transistors that transfer the charge to the first and second charge accumulation parts, and
on a basis of a region of interest of the imaging frame, the control part switches transfer signals being supplied to gates of the first and second transfer transistors.

(4)
The imaging device described in the (3), in which
the control part makes a speed at which the transfer signals being supplied to the gates of the first and second transfer transistors are switched in a region other than the region of interest lower than a speed at which the transfer signals being supplied to the gates of the first and second transfer transistors are switched in the region of interest.

(5)
The imaging device described in the (2), further including:
a region-of-interest determination part that determines the region of interest from output of the distance measuring calculation part, in which
on a basis of a determination result of the region of interest by the region-of-interest determination part, the control part executes switching control of the first and second charge accumulation parts by switching frequencies being different from each other between the region of interest and a region other than the region of interest.

(6)
The imaging device described in the (1), in which
on a basis of a determination result of a region of interest of the imaging frame, the control part executes switching control of the first and second charge accumulation parts by switching frequencies being different from each other between the region of interest and a region other than the region of interest, the determination result being provided from an external device.

(7)
An imaging method including:
receiving reflected light from a target region by a plurality of pixels being arranged in a matrix manner, each of the plurality of pixels having a light receiving element, and outputting an electric signal based on charge being accumulated in first and second charge accumulation parts in accordance with the reflected light, the light receiving element including first and second charge accumulation parts; and
executing switching control of the first and second charge accumulation parts by switching frequencies for each pixel region being constituted of a pixel group of at least one part of an imaging frame being formed by the plurality of pixels, the switching frequencies being different from each other.

REFERENCE SIGNS LIST 1A, 1B Distance measuring device
2 Host IC
10 system control part
20 Light emitting part
30 Light emitting timing adjustment part
40 Light receiving part
41 Pixel
41a Photodiode
41b Discharge transistor
41c, 41d Transfer transistors
41e, 41f Conversion efficiency adjustment transistors
41g, 41h Selection transistors
41i, 41j Amplification transistors
41k, 41l Reset transistors
41m, 41n Charge accumulation parts
43 Pixel driving line
44 Vertical signal line
45a Discharge control wire
45b, 45c Control lines
45d Conversion efficiency adjustment wire
45e Reset control wire
50, 53 Distance measuring processing part
51 AD conversion part 52 Distance computing circuit
60 Communication interface part
70 Pixel driving part
80 ROI region determination part
90A, 90B Pixel modulation part
91 TGA/TGB driver
92 Driver ON/OFF control circuit
93 Light emitting timing switching circuit
100 V (vertical) control determination part
911a, 911b, 913a, 913b, 915a, 915b Switch
912a, 912b, 914a, 914b, 916a, 916b Driver
921, 931 Clock oscillator
922, 923, 932 PLL circuit
924, 925, 933 Inverter
934, 935, 936 Frequency divider

The invention claimed is:

1. An imaging device, comprising:
a plurality of pixels configured to receive reflected light from a target region, wherein
the plurality of pixels is in a matrix arrangement,
each pixel of the plurality of pixels includes:
a light receiving element configured to output an electric signal based on a charge, and
a first accumulation part and a second accumulation part,
the charge is accumulated in one of the first accumulation part or the second charge accumulation part based on the reflected light;
a control part configured to execute switching control of the first accumulation part and second charge accumulation part by switching frequencies for each pixel region, wherein
the switching frequencies are different from each other,
the execution of the switching control of the first accumulation part and the second charge accumulation part is based on a determination result of a region of interest of the imaging frame,
the switching control of the first accumulation part and second charge accumulation part is between the region of interest and a region different from the region of interest,
the determination result of the region of interest of the imaging frame is supplied from an external device,
each pixel region is constituted of a pixel group,
the pixel group is of at least one part of an imaging frame, and
the pixel group comprises the plurality of pixels.

2. The imaging device according to claim 1, further comprising:
an analog/digital conversion part configured to convert the electric signal from an analog signal to a digital signal; and
a distance calculation part configured to calculate a distance up to the region of interest of the imaging frame from output of the analog/digital conversion part.

3. The imaging device according to claim 1, wherein
the light receiving element includes a first transfer transistor and a second transfer transistor,
the first transfer transistor is configured to transfer the charge to the first accumulation part,
the second transfer accumulation part is configured to transfer the charge to the second charge accumulation part,
the transfer of the charge to each of the first accumulation part and the accumulation part is based on the region of interest of the imaging frame, and
the control part is further configured to switch a plurality of transfer signals,
the plurality of transfer signals is supplied to gates of the first and second transfer transistors.

4. The imaging device according to claim 3, wherein
the control part is further configured to generate a first speed at which the plurality of transfer signals are switched in a region different from the region of interest, and
the first speed is lower than a second speed at which the plurality of transfer signals are switched in the region of interest.

5. The imaging device according to claim 2, further comprising
a region-of-interest determination part configured to determine the region of interest from output of the distance measuring calculation part, wherein
the control part is further configured to execute the switching control of the first charge accumulation part and the second charge accumulation part, based on a determination result of the region of interest by the region-of-interest determination part,
the switching control is by switching frequencies,
the switching frequencies are different from each other, and
the switching control is between the region of interest and a region different the region of interest.

6. An imaging method, comprising:
receiving, by a plurality of pixels, reflected light from a target region by a plurality of pixels, wherein
the plurality of pixels is in a matrix arrangement,
each pixel of the plurality of pixels includes:
a light receiving element, and
a first accumulation part and a second accumulation part;
accumulating, by the first accumulation part and the second accumulation part, a charge based on the reflected light;
outputting, by the light receiving element, an electric signal based on the charge being accumulated in the first accumulation part and the second charge accumulation parts; and
executing, by a control part, switching control of the first accumulation part and the second charge accumulation part by switching frequencies for each pixel region, wherein
the switching frequencies are different from each other,
the execution of the switching control of the first accumulation part and the second charge accumulation part is based on a determination result of a region of interest of the imaging frame,
the switching control of the first accumulation part and second charge accumulation part is between the region of interest and a region different from the region of interest,
the determination result of the region of interest of the imaging frame is supplied from an external device,
each pixel region is constituted of a pixel group,
the pixel group is of at least one part of an imaging frame, and
the pixel group comprises the plurality of pixels.

* * * * *